UNITED STATES PATENT OFFICE 2,079,548

COLLOIDIZED PIGMENTS OF BASIC DYES

Moses L. Crossley, Plainfield, Roy H. Kienle, Bound Brook, and George L. Royer, Somerville, N. J., assignors to The Calco Chemical Co., Inc., Bound Brook, N. J., a corporation of Delaware No Drawing. Application February 1, 1935,
Serial No. 4,518

18 Claims. (Cl. 134—58.5)

This invention relates to new colloidized pigment lakes prepared from basic dyes.

An important class of pigments is obtained by reacting basic dyes with complex acids such as phosphotungstic, phosphomolybdic, phosphotungstomolybdic, silicotungstic, silicomolybdic, silicotungstomolybdic, and the like. These lakes are extensively used for coloring paper, plastics, etc. Pigments have also been produced from reduced complex metal acids and for some purposes these reduced lakes are preferable as they show a slightly enhanced light fastness. While the reaction of the dye is undoubtedly with the complex metal acid itself, normally the complex metal acid is introduced into the reaction in the form of its alkali metal salts as the acid itself is usually not readily soluble in water and the dye is used as a hydrochloride or the like to render it soluble.

The above pigments are, of course, insoluble in water and have hitherto required extensive stirring in order to disperse them in the products in which they are to be used. The dispersion is also usually not complete because of the presence of agglomerated particles of pigment. This is particularly noticeable when the pigments are used in the form of dry powders instead of in the form of pastes, although even in the form of pastes the dispersion is not normally complete. Not only does incomplete dispersion present the problem of spots due to larger aggregates, but the tinctorial power of the pigment is low. The tinctorial power of a pigment depends, of course, on its surface and in large agglomerates the pigment in the center of the agglomerate of course does not contribute any tinctorial effect.

A more serious disadvantage of the pigments of the prior art lies in their slowness of dispersion which requires an unreasonably long stirring and results in incomplete dispersion with low tinctorial power, giving in some cases a spotty or marbled product. It has been proposed to make up the pigments in pastes with various deflocculating agents, but while the dispersibility of the product is increased to some extent, the pastes frequently deteriorate on standing and are difficult to handle and ship. It is preferred, therefore, to reduce the pigments admixed with suitable diluting agents and in some cases protective agents, to dry powders. However, the dry powders available up to the time of the present invention have had even lower dispersibility and tinctorial value than the pastes and the advantages of a dry powder are, therefore, in practice at least partially lost.

It has been proposed in the Bishop and Thompson Pat. No. 1,659,131, to produce a powder by dispersing the pigment in a foam of soap bubbles, the foam containing a protecting agent, dextrin, and a diluent such as sucrose. The foam is dried and ground to a powder which has slightly higher dispersibility than some of the ordinary dry powders commercially available but which causes serious foaming in many coloring processes such as, for example, in coloring paper. Even by the Bishop and Thompson process, however, products are obtained having very low dispersibility as will appear from the description of dispersibility tests which follows the specific examples in the present specification.

High dispersibility is not the only property which lake pigment powders should possess. It is also very desirable that the products should have low hygroscopicity because otherwise if stored in contact with the atmosphere, water is picked up and the powder tends to form balls, or in some extreme cases may actually revert to a paste. Attempts to increase dispersibility such as for example by using highly effective wetting agents in large quantities, increases the hygroscopicity. In general, products of the prior art had low dispersibility and low hygroscopicity. It is an outstanding advantage of the present invention that the tremendously high auto dispersibility inherent in products of the present invention, is obtained without increasing to any material extent the hygroscopicity of the product.

According to the present invention, lake pigments from basic dyes and complex metal acids are deflocculated; the deflocculated particles coated with a film of suitable protecting agents; diluting, anti-dusting and wetting agents, if desired, properly incorporated; and the whole carefully converted to a dry powder. The products so produced are almost completely dispersible and disperse with great speed without stirring, approximating the dispersibility of very soluble solids. This property of behaving as if the material were highly soluble in water, will be referred to in the specification and claims as "auto-dispersibility". A measure of this property will be given in the description of "auto-dispersibility" tests which will follow the specific examples. The present invention includes not only the product itself, but also the process whereby it is produced.

In carrying out the present invention, a lake of a basic dye and a complex metal acid is deflocculated and the particles thereof protected by kneading in the form of a stiff paste in the presence of a suitable protecting agent, which may usually be colloidal in nature and which serves to coat the minute particles of the pigment after deflocculation with a film of protective agent which prevents agglomeration of the particles on drying and which aids in their rapid auto-dispersibility in use. The paste during kneading must be so stiff that it exerts a shearing action on the finely divided pigment particles so that any flocks are broken up into individual particles which in most cases are of the order of a very few microns. The kneading or working of the paste is preferably carried out in kneading machines such as ordinary dough mixers, for example of the Werner and Pfleiderer or Day types. Other mixers which are capable of handling a stiff paste may also be employed, such as, for example, a Banbury mixer. The present invention is not concerned with the use of any particular type of mixing apparatus and any mixer may be employed which is mechanically capable of handling a stiff paste.

The paste produced by the present invention has an extremely high auto-dispersibility and when it is dehydrated cautiously either by drying with moderate temperatures, for example, under a vacuum or by the use of appropriate dehydrating substances and ground into a powder, the auto-dispersibility is not lost, since the individual pigment particles are completely separated and are coated with a film of protecting agent which does not tend to crack off on drying.

In addition to the pigment itself, the present invention requires the use of a protective agent and normally also a deflocculating agent. For most uses, the paste also requires a diluting agent and the powder preferably may contain wetting agents which act to alter the surface tension on contact with water between the faces of the pigment particles and cause them to be rapidly repelled and hence to disperse through the water or other medium in which the pigment is being incorporated. It is also advantageous, although not essential, to add a suitable antidusting agent which facilitates shipment and use of the powder. The use of antidusting agents, which are usually hygroscopic, constitute a recent development in the art and are not included with most commercial pigment powders produced prior to the present invention. Many substances perform more than one function. Thus, for example, some of the common protective agents are also good deflocculating agents. In the following brief enumeration of a few well known examples of the various classes, it will therefore be noted that the same material may appear in several categories.

Deflocculating agents

Dextrine is an example of a commercial deflocculating agent. Various types of dextrin, including yellow dextrin, may be used and they have the advantage over such deflocculating agents as tannic acid that they are also good protecting agents. A number of other carbohydate colloids are also suitable. A second and preferred class of deflocculating agents are the synthetic tanning aids of the sulfonated diarylmethane type. The most common member is the sodium salt of disulfodinaphthylmethane. This deflocculating agent has a further advantage that it is also a wetting agent.

Protective agents

These agents are primarily colloidal materials which form films around the minute pigment particles which films are sufficiently elastic so that they do not crack off on drying and are preferably soluble in water, or at least take up water to swell. The commercially most attractive class of protecting agents are the carbohydrate colloids such as the dextrins. These agents give very satisfactory films, they are cheap and do not introduce into the pigment any components which would be harmful in the products which are to be colored by the pigment. Another typical protective agent is an alkali salt of lignin sulfonic acids which are obtained from the waste liquor of the sulfite process of producing wood pulp. While the above two classes of protective agents are the preferred examples, the invention includes the use of any other protective agents, for example, gelatin, albumens, silicates, colloidal clays, etc., capable of forming a satisfactory film around the individual pigment particles.

Diluting agents

The diluting agents are mainly carbohydrates such as sugar, dextrose, "Cerelose", xylose and the like. In fact, any of the common soluble carbohydrates are suitable. It is an advantage of the present invention that it is applicable to pigment pastes and dry powders containing the standard diluents used in the art. The invention is, however, not concerned with the use of any specific diluent and where a pigment in undiluted form is desired, the diluent may, of course, be eliminated. "Cerelose" which is the registered trademark of a brand of corn sugar is particularly desirable as it permits producing a product of very low hygroscopicity.

Wetting agents

Any of the usual wetting agents can be used which are suitable for the particular conditions of alkalinity or acidity of the coloring process in which the pigment is to be used. The alkylnaphthalene sulfonates are among the best wetting agents and the readily commercially available products such as sodium isopropylnaphthalene sulfonate and sodium secondary butylnaphthalene sulfonate constitute preferred members. The synthetic tanning agents of the disulfodiaryl methane type such as disulfodinaphthylmethane, are also very effective and have the additional desirable feature as referred to above under deflocculating agents, of serving as combined wetting and deflocculating agents. The alkali and alkaline earth metal salts of lignin sulfonic acids from another class of wetting agents which have the additional advantage of being at the same time protecting agents. Sodium salts of sulfonated lauryl, cetyl, and similar high molecular alcohols, are also excellent wetting agents and may be used to advantage in the present invention. Another class of wetting agents are the ethers of polyglycols such as, for example, the ethyl ether of diethylene glycol. These wetting agents are also antidusting agents. Examples of other compounds which are both wetting agents and antidusting agents are certain esters of ethers of simple polyhydric alcohols, such as for example, the acetates of the methyl, ethyl or butyl ether of ethylene glycol. These esters are in general combined antidusting and wetting agents when they are partially miscible with water.

The above enumeration of a few classes of wetting agents is not intended as limiting the invention to these products. They are typical of some of the well known wetting agents which have proven highly successful in the present invention and which are preferred, but any other wetting agent which does not introduce undesirable components into the final product may be employed.

Antidusting agents

These agents are mostly hygroscopic and tend to absorb sufficient water from the atmosphere to prevent the finely ground pigment from dusting. The earliest antidusting agent used was glycerine and this is effective. However, where a pure antidusting action is desired, the esters of ether alcohols with low molecular organic acids are preferred. Thus, for example, the acetates or formates of the ethyl, methyl, or butyl ethers of ethylene glycol are antidusting agents of the highest efficiency. Similar esters of other ether alcohols and other low molecular organic acids may be used. The ethers of condensed polyhydric alcohols such as the ethyl ether of diethylene glycol, are also very effective and have the additional advantage that they are also wetting agents.

It might appear that the use of an antidusting agent which operates by reason of its hygroscopic properties, would result in producing a very hygroscopic pigment powder and would therefore defeat one of the main advantages of the present invention. However, the antidusting agents are present in such minute quantities that although they prevent dusting by reason of their high hygroscopicity, they form so minute a fraction of the pigment powder that they do not materially increase the hygroscopicity of the pigment as a whole.

Basic dyes

The pigment lakes are produced from practically all basic dyes. Among typical groups are the following:

Amino polyarylmethane derivatives, particularly methyl and crystal violets.
Thiazines, such as methylene blue.
Acridines.
Phosphines.
Xanthenes such as rhodamine.
Ketone imides such as auramine.
Certain basic azo dyes such as chrysoidine.
Basic quinoline dyes such as some of the cyanines, involving a quaternary nitrogen base.
Indamines.
Thiazoles.
Oxazines.
Sulfonation products of basic dyes in which the degree of sulfonation is not such as to destroy their basicity, may also be employed.

Normally, the lake is produced by the reaction of a soluble salt of the metal acid with the basic dye which may usually be in the form of its soluble salt such as the hydrochloride. In the claims, the pigments will be referred to as the reaction products of the dye and metal acid because these are the only components entering into the lake. The acid of the basic dye salt and the base of the metal acid salt are present only to confer the solubility and do not in all probability enter into the reaction.

The invention will be described in greater detail in connection with the following specific examples which are illustrative only and do not limit the invention:

Example I 1000 parts of a methyl violet phosphotungstate lake press cake containing about 35% solids are introduced into a Werner and Pfleiderer dough mixer and 7 parts of sodium isopropylnaphthalene sulfonate are added. When this mixture has become homogeneous 350 parts of dextrine are added slowly and the entire mass kneaded until a smooth paste is obtained. This material is dried in a vacuum oven at 65° C. and ground to a fine powder. The powder is returned to the mixer and approximately 25 percent of water added. The thick magma which results is kneaded for about three hours, dried in a vacuum oven at approximately 65° C. and granulated. 125 parts of "Cerelose" and 1 part of the monoethyl ether of diethylene glycol are added to every 75 parts of the powdered material, which was described above, by dry-blending in a ball mill. The resulting product has a very high autodispersibility, and very low hygroscopicity.

Example II 250 parts of a methyl violet phosphomolybdate lake press cake which contains about 30% solids are placed in a Werner and Pfleiderer dough mixer and 1.5 parts of sodium isopropylnaphthalene sulfonate added and the mixture made homogeneous. Then 80 parts of the dried sodium salt of lignin sulfonic acid residue are added very slowly and the mass kneaded for three hours. It is then dried in a vacuum oven at 65° C. and ground to a coarse powder. This powder is returned to the dough mixer with about 25 percent of water and the resultant magma kneaded for three hours. After drying in a vacuum drier it is granulated and 125 parts of xylose and 1 part of sodium secondary butylnaphthalene sulfonate are added to 75 parts of the pulverized material. The resulting product has a very high autodispersibility and low hygroscopicity.

Example III 1000 parts of a methylene blue N phosphotungstate lake filter press cake containing about 25% solids are placed in a Werner and Pfleiderer and 5 parts of sodium dinaphthylmethane sulfonate are thoroughly mixed in by the kneading action of the dough mixer. After the mixture becomes homogeneous 250 parts of yellow dextrine are added slowly and the mass kneaded for three hours, vacuum dried at 65° C. and ground to a coarse powder. This powder is placed in a dough mixer and about 25 percent of water added and the resultant plastic magma is subjected to the shearing action of the dough mixer, dried in vacuum oven at 65° C. and granulated. 125 parts of cane sugar and 1 part of the monoethyl ether of diethylene glycol are added to 75 parts of the fine powder by dry-blending in a ball mill.

Example IV 1000 parts of a methyl violet phosphotungstate lake press cake containing about 35% solids are introduced into the Werner and Pfleiderer dough mixer and 7 parts of sodium isopropylnaphthalene sulfonate added. The dough mixer is provided with a steam jacket and when the mixture has become homogeneous, 350 parts of dextrine are slowly added, and the entire mass kneaded until a smooth paste is obtained. The steam is then turned on and sufficient water removed until the mixture becomes a thick plastic paste. The kneading is then continued for about 3 hours, the product dried in a vacuum oven at approximately 65° C. and granulated. 125 parts of "Cerelose" and 1 part monoethyl ether of diethylene glycol are added to every 75 parts of the granulated material by dry blending in a ball mill. The resulting product has substantially the same characteristics of high autodispersibility and low hygroscopicity as the product of Example I.

*Example V*

A lake of methyl violet and phosphotungstic acid is prepared containing approximately 20% of solids. 600 parts by weight of this lake are mixed with 400 parts of dextrin and stirred until all of the dextrin and lake are in the form of a homogeneous mixture. This mixture is then dried at approximately 90° C. 25 parts of water are placed in a Day kneading mill and 100 parts of the dried mixture are slowly added. The kneading is continued until a smooth, plastic paste is obtained whereupon 5 parts of water and 1 part of the sodium salt of isopropylnaphthalene sulfonic acid is added. The mixture should be sufficiently fluid to pour out of the mill. The paste is poured into a container and dried under vacuum at 65° C. until about 95% of the water has been removed. The dried product is then ground to a fine powder which shows a high degree of autodispersibility.

*Example VI*

A lake is prepared as in Example V except that Victoria blue is used instead of methyl violet. The mixture is dried at approximately 90° C. and 100 parts are placed in a Day mill with 25 parts of water until a smooth, plastic paste is obtained. 5 parts of water and 1 part of sodium salt of disulfodinaphthylmethane is then incorporated; the paste is poured into a container and dried at approximately 65° C. under vacuum until about 95% of the water has been removed. The solid is then ground to a powder.

*Example VII*

A phosphotungstate lake of a mixture of Victoria blue and methyl violet is prepared as described in Example V and mixed with dextrin to produce a product containing approximately 80% dextrin and 20% lake (dry weight); 400 parts of the powdered dry product is placed in a Werner and Pfleiderer dough mixer and 100 parts of water added at a rate such as to obtain a homogeneous plastic mass, the kneading being continued until a uniform composition is obtained which normally requires approximately 3 hours. The mixture is then transferred to pans and dried in a vacuum oven at about 60° C. When the product is dried it is cooled and transferred to a mill and ground to a powder.

*Example VIII*

100 parts of methylene blue phosphomolybdate lake are mixed with 25 parts of dextrin and the mixture concentrated to a thick dough which is then placed in a Banbury mixer and kneaded until a smooth plastic mixture is made. 45 parts of dextrose is then kneaded into a viscous mass until a homogeneous product is obtained which is then transferred to pans and dried in a vacuum dryer at approximately 60° C. down to about 5% moisture. The dried product is then cooled and ground to a powder.

*Example IX*

384 parts by weight of a press cake of the methyl violet and Victoria blue lakes of phosphotungstic acid, containing about 26% real dyestuff, are placed in a Werner and Pfleiderer mixer. 2 parts of sodium dinaphthylmethane sulfonate are added and 100 parts of yellow dextrine. Kneading is continued until a smooth plastic magma results. This is dried in shallow pans in a vacuum oven at 65° C. and the dried product broken up. The product together with about 25% by weight of water is again placed in the mixer and kneaded until a thick plastic magma results. Then 300 parts of powdered bentonite are added with sufficient water to retain the thick plastic condition that is given by the reworked lake and water only. This is worked for about 4 hours, and then the product is transferred to shallow metal pans and vacuum dried at about 65° C. Finally 5 parts of sodium secondary butyl naphthalene sulfonate are dry-blended with the dried product in a ball mill.

The above examples describe grinding the kneaded pastes after they have been dried. This constitutes a preferred modification of the specification as dried powders are more desirable commercially than pastes. However, for certain purposes the pastes may be desired and they can be directly used showing autodispersibility of approximately the same degree as the powder. In its broader aspects the invention therefore is not limited to a production of a dry powder. This constitutes only the preferred specific embodiment of the invention.

*Autodispersibility tests.*—In order to have a definite measurement of autodispersibility the following test has been devised and is in general use by the Calco Chemical Company: A 4 inch square piece of coarsely woven cotton cloth of the grade customarily used in laundry bleaching bags is placed over the mouth of an 8 ounce glass bottle and held in place by a rubber band. One gram of the powder to be tested, ground to a fineness of 200 mesh is placed on the cloth and 25 cc. of water from a pipette is run over the powder into the bottle. The rate of flow of the water is adjusted so that it takes 80 seconds for the 25 cc. of water to run through the cloth. The cloth is then carefully removed, dried and weighed. The difference between this final weight and the original weight of the cloth and powder is ascertained. This difference expressed as a percentage is termed the "autodispersibility". The test is so chosen that a material which is completely miscible such as a very rapidly dissolving solid will be completely dissolved and therefore would be termed to have 100% autodispersibility. The test measures two factors at the same time, namely, the amount of the pigment which can be dispersed and also the rate at which it is dispersed. These are the two factors which enter into the commercial use of a pigment and therefore the test for autodispersibility measures the value of a given pigment powder in practical use. In order to compare the various powders commercially available with the new dyes of the present invention comparative tests were made on the blue lake of Example I which is sold by the Calco Chemical Company under the trade-mark "Helmerco Blue". This was compared with the same lake formerly sold by Calco under the same trade-mark and with an average of three main competing lake powders in the American market at the time the present invention was made. In order to have a comparative test of pigments prepared under the procedure of the Bishop and Thompson patent, a blue pigment was prepared as follows: 263 gms. of a press cake from the lake produced by the reaction of crystal violet with phosphotungstic acid and containing 100 grams of solids was mixed with 150 grams of soap, 250 grams of dextrin and 100 cc. of water in a dough mixer, the blades revolving at a high rate. When the volume of the material had increased about three times it was poured into trays and dried at 80° C. in an air circulating oven, ground and sieved through a 200 mesh. This product is referred to as Bishop and Thompson 'N'. In order to compare the Bishop and Thompson disclosure using more modern materials a product was made up as described but substituting 150 grams of a sulfonated lauryl alcohol wetting agent. This will be referred to as Bishop and Thompson 'G'. All of the products were tested for autodispersibility as described above and the results of the test are summarized in the following table:

| Name | Autodispersibility percent |
|---|---|
| Helmerco blue new (Ex. I) | 91.2 |
| Helmerco blue old | 21.5 |
| Average of competing products | 33. |
| Bishop and Thompson 'N' | 21.8 |
| Bishop and Thompson 'G' | 51. |

The enormously greater autodispersibility of the products of the present invention is clearly brought out by the above tests. The autodispersibility of all of the products of the various examples is substantially the same and ranges from 90 to 92%. The competing products including the product formerly made by Calco, did not exceed 33%. The autodispersibility of the Bishop and Thompson product 'N' was similar to that formerly sold by Calco but because of the availability at the present time of very powerful wetting agents produced from the sulfonated lauryl alcohols, and which are much more powerful wetting agents than the soap of the Bishop and Thompson patent, the product marked Bishop and Thompson 'G' was prepared in order to test out the disclosure of the patent using the most effective modern reagents. Even when the powerful wetting agent is used, the results are scarcely better than 50%.

A number of tests of various portions of the same sample have been made in order to determine the approximate accuracy of the tests. It is found that the experimental error or variation in the tests rarely exceeds 2% and never exceeds 5%. The figures given in the table above are averages and are accurate to approximately 2%.

The greatly increased dispersibility of the products made according to the present invention have permitted marked savings in the use of the pigment and have resulted in producing colored products of greater uniformity with small consumption of pigments. New standards have been set by these products and practical tests show that no pigment powder having autodispersibility less than 75% will give acceptable results today. Pigments having an autodispersibility of 90% or over show even better results but autodispersibility in excess of 90% does not appear to be of any material value because in all the processes using pigment powders there is a certain amount of stirring inherently necessary in the application of the pigment and the difference of speed in dispersion between 90 and 100% cannot be therefore practically utilized because in actual commercial procedure it is stirred sufficiently so that a product of 90% or over autodispersibility will show practically the same results as one of 100%. It is possible to obtain slightly higher than 91 to 92% autodispersibility of the products prepared according to the examples of the present invention by particular care and the use of larger quantities of wetting agents; such products do not, however, have any practical advantage in use and since they are more expensive they are not economically justified. The present invention as described in the examples, and without special modification, reliably gives an autodispersibility of 90% or more with every lake pigment tested.

*Hygroscopicity tests.*—In order to determine the hygroscopicity of the products of the present invention, they were tested by exposing them in a desiccator in an atmosphere of 86% relative humidity maintained by keeping in the desiccator a considerable quantity of a saturated potassium chloride solution. The tests took place at room temperature. It was found that with the very low hygroscopic pigments of the present invention, water was taken up for several days and then a state of substantial equilibrium was reached after which practically no more moisture was taken up. With products of the present invention, this is reached after about two days, but when some competing products were tested they showed much higher hygroscopicity and continued to absorb water for a longer period of time. In order to obtain a reliable test, the exposure was continued for a period of one week. Helmerco blue, prepared as in Example I, absorbed just under 10% of water in two days and at the end of a week had absorbed approximately 12%. The corresponding blue of competing makes having fairly high autodispersibility, absorbed almost 40% of water in one week. As a practical matter, a powder which absorbs more than 20% of water becomes practically useless as a powder. All of the products of the present invention have a hygroscopicity of less than 20% measured, as above, by water absorption at the end of a week, the variations depending to some extent on the diluting agent used. Thus, "Cerelose" alone shows a lower hygroscopicity than the finished powder, namely approximately 5% of water after seven days; whereas dextrin is slightly more hygroscopic than the pigment of Example I. "Cerelose" is therefore a preferred diluting agent from the standpoint of hygroscopicity.

In the claims the expression "protective agent" is used only in the sense defined on page 2 of the specification and it will be understood that it has no other meaning when so used.

We claim:

1. A dispersible pigment powder containing as a major coloring compound a pigment lake produced by the reaction of a basic dye with a complex acid included in the group consisting of phosphotungstic, phosphomolybdic, phosphotungstomolybdic, silicatungstic silicomolybdic, silicotungstomolybdic, a sufficient proportion of the individual pigment particles being individually coated with a hydrophyllic "protective agent" so that the pigment powder as a whole possesses an "autodispersibility" of not less than 75%.

2. A dispersible pigment powder containing as a major coloring compound a pigment lake produced by the reaction of a basic dye with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 90%.

3. A dispersible pigment powder containing as a major coloring compound a pigment lake produced by the reaction of a basic dye of the aminotriarylmethane type with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%.

4. A dispersible pigment powder containing as a major coloring compound a pigment lake produced by the reaction of a basic dye of the aminotriarylmethane type with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "antodispersibility" of not less than 90%.

5. A dispersible pigment powder containing as a major coloring compound a pigment lake produced by the reaction of a basic dye of the methyl violet type with a phosphotungstic acid, a sufficient proportion of the individual pigment particles being individually coated with a hydrophyllic "protective agent" so that the pigment powder as a whole possesses an "autodispersibility" of not less than 75%.

6. A dispersible pigment powder containing as a major coloring compound a pigment lake produced by the reaction of a basic dye of the methyl violet type with a phosphotungstic acid, a sufficient proportion of the individual pigment particles being individually coated with a hydrophyllic "protective agent" so that the pigment powder as a whole possesses an "autodispersibility" of not less than 90%.

7. A dispersible pigment powder containing as a major coloring compound a pigment lake produced by the reaction of a basic dye with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%, the powder also having associated therewith a wetting agent.

8. A dispersible pigment powder containing as a major coloring compound a pigment lake produced by the reaction of a basic dye with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%, the pigment powder having also associated therewith an antidusting agent.

9. A dispersible pigment powder containing as a major coloring compound a pigment lake produced by the reaction of a thiazine dye with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%.

10. A dispersible pigment powder containing as a major coloring compound a pigment lake produced by the reaction of methylene blue with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%.

11. A dispersible pigment powder containing as a major coloring compound a pigment lake produced by the reaction of a basic dye with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%, the pigment powder having a hygroscopicity of less than 20%.

12. A dispersible pigment powder containing as a major coloring compound a pigment lake produced by the reaction of a basic dye of the aminotriarylmethane type with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%, the pigment powder having a hygroscopicity of less than 20%.

13. A dispersible pigment powder containing as a major coloring compound a pigment lake produced by the reaction of a basic dye with a complex acid included in the group consisting of phosphotungstic, phosphomolybdic, phosphotungstomolybdic, silicotungstic, silicomolybdic, silicotungstomolybdic, a sufficient proportion of the individual pigment particles being individually coated with a hydrophyllic "protective agent" so that the pigment powder as a whole possesses an "autodispersibility" of not less than 75%, the pigment powder having a hygroscopicity of less than 20% and containing an anhydrous, relatively non-hygroscopic dextrose as a diluting agent.

14. A dispersible pigment paste containing as the major coloring component a pigment lake produced by the reaction of a basic dye with a complex metal acid included in the group consisting of phosphotungstic, phosphomolybdic, phosphotungstomolybdic, silicotungstic, silicomolybdic, silicotungstomolybdic, a sufficient proportion of the individual pigment particles in the paste being coated with a "protective agent" so that the paste as a whole possesses an "autodispersibility" of not less than 75%.

15. A process of producing a pigment product having a high degree of "autodispersibility" from lake pigments obtained by the reaction of basic dyes with complex metal acids included in the group consisting of phosphotungstic, phosphomolybdic, phosphotungstomolybdic, silicotungstic, silicomolybdic, silicotungstomolybdic, which comprises dispersing the pigment in a kneading machine in the form of a paste sufficiently thick so that the pigment particles are sheared by kneading, the kneading taking place for a sufficient time in the presence of a "protective agent" so that the proportion of individual pigment particles coated with the "protective agent" is sufficient to give pigment powders or pastes produced from the product an "autodispersibility" of not less than 75%.

16. A method according to claim 15 in which the "protective agent" is dextrin.

17. A method according to claim 15 in which the kneading takes place in the presence of a deflocculating agent.

18. A method according to claim 15 in which the kneading takes place in the presence of a combined deflocculating and wetting agent of the sulfonated diarylmethane type.

MOSES L. CROSSLEY.
ROY H. KIENLE.
GEORGE L. ROYER.